(12) United States Patent
Harayama

(10) Patent No.: US 10,317,237 B2
(45) Date of Patent: Jun. 11, 2019

(54) NAVIGATION APPARATUS DISPLAYING INFORMATION RELATED TO TARGET INTERSECTION

(71) Applicant: DENSO CORPORATION, Kariya, Aichi-pref. (JP)

(72) Inventor: Tomoya Harayama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 155 days.

(21) Appl. No.: 15/111,861

(22) PCT Filed: Jan. 14, 2015

(86) PCT No.: PCT/JP2015/000122
§ 371 (c)(1),
(2) Date: Jul. 15, 2016

(87) PCT Pub. No.: WO2015/111385
PCT Pub. Date: Jul. 30, 2015

(65) Prior Publication Data
US 2016/0334238 A1 Nov. 17, 2016

(30) Foreign Application Priority Data
Jan. 21, 2014 (JP) ................. 2014-008899

(51) Int. Cl.
*G01C 21/36* (2006.01)
*G09B 29/10* (2006.01)
*G01C 21/34* (2006.01)

(52) U.S. Cl.
CPC ....... *G01C 21/367* (2013.01); *G01C 21/3632* (2013.01); *G01C 21/3644* (2013.01);
(Continued)

(58) Field of Classification Search
CPC .............. G01C 21/367; G01C 21/3632; G01C 21/3644; G01C 21/3658; G01C 21/34; G09B 29/102; G09B 29/106
See application file for complete search history.

(56) References Cited

U.S. PATENT DOCUMENTS 5,847,661 A * 12/1998 Ricci ...................... G01S 13/931
340/10.41
6,006,161 A * 12/1999 Katou .................. G08G 1/0969
340/988
(Continued)

FOREIGN PATENT DOCUMENTS

JP 2001311625 A 11/2001
JP 2004286761 A 10/2004
(Continued)

*Primary Examiner* — Thomas G Black
*Assistant Examiner* — Sze-Hon Kong
(74) *Attorney, Agent, or Firm* — Harness, Dickey & Pierce, P.L.C.

(57) ABSTRACT

The present disclosure provides a navigation apparatus that is capable of switching between the display of a direction sign image and the display of an enlarged view of an intersection and reducing an erroneous recognition of a target intersection made by a driver. The navigation apparatus displays the direction sign image related to the target intersection when a distance between the host vehicle and an installation location of the direction sign is within a sign display distance. The navigation apparatus displays an intersection enlarged view of the target intersection when a distance between the host vehicle and the target intersection is within an enlarged view display distance, which is set shorter than the sign display distance.

5 Claims, 9 Drawing Sheets

(52) U.S. Cl.
CPC ....... *G01C 21/3658* (2013.01); *G09B 29/102* (2013.01); *G09B 29/106* (2013.01); *G01C 21/34* (2013.01)

(56) References Cited

U.S. PATENT DOCUMENTS

| | | | | |
|---|---|---|---|---|
| 6,202,026 B1* | 3/2001 | Nimura | G01C 21/367 | 340/995.11 |
| 6,269,304 B1* | 7/2001 | Kaji | G01C 21/3658 | 342/70 |
| 6,324,467 B1* | 11/2001 | Machii | G01C 21/32 | 701/420 |
| 6,360,168 B1* | 3/2002 | Shimabara | G01C 21/3638 | 340/990 |
| 6,694,255 B1* | 2/2004 | Kainuma | G01C 21/3647 | 701/428 |
| 2002/0010543 A1* | 1/2002 | Watanabe | G01C 21/3608 | 701/438 |
| 2002/0188400 A1* | 12/2002 | Sato | G01C 21/3415 | 701/455 |
| 2003/0078727 A1* | 4/2003 | Komatsu | G01C 21/3461 | 701/411 |
| 2005/0149262 A1* | 7/2005 | Oikubo | G01C 21/3658 | 701/431 |
| 2006/0031005 A1* | 2/2006 | Sakano | G01C 21/3638 | 701/455 |
| 2006/0149467 A1* | 7/2006 | Nakayama | G01C 21/367 | 701/431 |
| 2006/0178826 A1 | 8/2006 | Gomi | | |
| 2007/0005241 A1* | 1/2007 | Sumizawa | G01C 21/367 | 701/437 |
| 2007/0088502 A1* | 4/2007 | Oumi | G01C 21/3641 | 701/417 |
| 2007/0106470 A1* | 5/2007 | Nakayama | G01C 21/3629 | 701/437 |
| 2007/0124068 A1* | 5/2007 | Nakayama | G01C 21/3655 | 701/414 |
| 2007/0124069 A1* | 5/2007 | Nakayama | G01C 21/3644 | 701/423 |
| 2007/0192020 A1* | 8/2007 | Brulle-Drews | G01C 21/3647 | 701/532 |
| 2008/0027637 A1* | 1/2008 | Sakano | G01C 21/367 | 701/533 |
| 2008/0208466 A1* | 8/2008 | Iwatani | G01C 21/3632 | 701/431 |
| 2009/0216440 A1* | 8/2009 | Funato | G01C 21/3626 | 701/414 |
| 2009/0237413 A1* | 9/2009 | Ogawa | G01C 21/3605 | 345/548 |
| 2010/0023257 A1* | 1/2010 | Machino | G01C 21/34 | 701/533 |
| 2010/0026804 A1* | 2/2010 | Tanizaki | G01C 21/3629 | 348/148 |
| 2010/0138153 A1* | 6/2010 | Abe | G01C 21/3647 | 701/532 |
| 2010/0207787 A1* | 8/2010 | Catten | G06F 17/30241 | 340/905 |
| 2010/0256900 A1* | 10/2010 | Yamaguchi | G01C 21/36 | 701/533 |
| 2011/0288766 A1* | 11/2011 | Nagasawa | G01C 21/3632 | 701/533 |
| 2012/0078513 A1* | 3/2012 | Oaki | G01C 21/3664 | 701/527 |
| 2013/0103304 A1* | 4/2013 | Nishibashi | G01C 21/3655 | 701/410 |
| 2013/0282273 A1* | 10/2013 | Tanaka | G01C 21/34 | 701/428 |
| 2014/0163878 A1* | 6/2014 | Asano | G01C 21/3658 | 701/533 |
| 2015/0260540 A1* | 9/2015 | Ishikawa | G01C 21/3632 | 701/436 |
| 2015/0293354 A1* | 10/2015 | Oishi | G08G 1/095 | 345/7 |
| 2016/0305794 A1* | 10/2016 | Horita | G01C 21/3602 | |
| 2017/0038941 A1* | 2/2017 | Pylappan | G06F 3/04815 | |

FOREIGN PATENT DOCUMENTS

| | | |
|---|---|---|
| JP | 2005214630 A | 8/2005 |
| JP | 2006214965 A | 8/2006 |
| JP | 2008045925 A | 2/2008 |
| JP | 2012052932 A | 3/2012 |
| JP | 2012220480 A | 11/2012 |
| WO | WO-2013088510 A1 | 6/2013 |

* cited by examiner

NAVIGATION APPARATUS DISPLAYING INFORMATION RELATED TO TARGET INTERSECTION

CROSS REFERENCE TO RELATED APPLICATIONS

This application is a U.S. National Phase Application under 35 U.S.C. 371 of International Application No. PCT/JP2015/000122 filed on Jan. 14, 2015 and published in Japanese as WO 2015/111385 A1 on Jul. 30, 2015. This application is based on and claims the benefit of priority from Japanese Patent Application No. 2014-008899 filed on Jan. 21, 2014. The entire disclosures of all of the above applications are incorporated herein by reference.

TECHNICAL FIELD

The present disclosure relates to a navigation apparatus that displays an image of a direction sign indicative of directions to possible destinations of respective roads connected at an intersection.

BACKGROUND ART

A navigation apparatus disclosed, for instance, in Patent Literature 1 displays an image of a direction sign that indicates directions to possible destinations of respective roads connected at an intersection. When the distance between a host vehicle and an intersection toward which the host vehicle travels is equal to or shorter than a predetermined threshold value, the navigation apparatus disclosed in Patent Literature 1 controls a display screen to display the image of a direction sign indicating direction information at the intersection. This configuration enables a driver to recognize the direction of intended route at the intersection by viewing the direction sign.

Meanwhile, a navigation apparatus disclosed in Patent Literature 2 displays a facility mark, which serves as a landmark, over an enlarged view of a target intersection when the distance between the target intersection and a host vehicle is equal to or shorter than a predetermined value (enlarged-view display distance) during route guidance. Here, the target intersection is, for example, an intersection at which a left turn or a right turn is required to be made under route guidance or an intersection having a complicated shape.

Using the navigation apparatus disclosed in Patent Literature 1, the driver can check an image of a direction sign, which is installed at an intersection for guidance purposes, and is able to recognize the direction of intended route (for example, moving straight forward or turning left) at the intersection. However, the image of the direction sign does not include information about a facility serving as a landmark of the intersection. Therefore, for example, when another intersection exists near the intersection associated with a currently displayed direction sign image, the driver may erroneously recognize another intersection as the intersection associated with the currently displayed direction sign image. When such erroneous recognition occurs during a display of the direction sign image for the target intersection, the host vehicle deviates from the guidance route.

When the navigation apparatus disclosed in Patent Literature 2 is used to display an enlarged view of an intersection, the information about a facility serving as a landmark of the intersection is displayed together with the intersection. This reduces the possibility of the driver missing a target intersection. However, Patent Literature 2 does not describe a scheme for displaying a direction sign image. Besides, Patent Literature 2 does not describe a display condition of a direction sign at an intersection and a display condition of an enlarged view of an intersection.

Further, Patent Literature 1 describes the display of a direction sign image, but describes nothing about display of an enlarged view of an intersection. Further, Patent Literature 1 also does not describe a display condition of a direction sign at an intersection and a display condition of an enlarged view of an intersection. In other words, a method of switching between the display of a direction sign image at an intersection and the display of an enlarged view of the same intersection has not yet been studied.

PRIOR ART LITERATURES

Patent Literature

Patent Literature 1: JP 2008-45925 A
Patent Literature 2: JP 2006-214965 A

SUMMARY OF INVENTION

In view of the foregoing difficulties, it is an object of the present disclosure to provide a navigation apparatus that is capable of switching between the display of a direction sign image and the display of an enlarged view of an intersection and reducing an erroneous recognition of a target intersection made by a driver.

According to an aspect of the present disclosure, a navigation apparatus includes a host vehicle location acquisition unit, a route guidance unit, a display control unit, a sign image acquisition unit, and an intersection enlarged view acquisition unit. The host vehicle location acquisition unit acquires a current location of a host vehicle. The route guidance unit performs a route guidance process for guiding the host vehicle along a guidance route from the current location of the host vehicle to a destination based on the current location of the host vehicle and map data indicative of road connections. The current location of the host vehicle is acquired by the host vehicle location acquisition unit. The display control unit controls a display of an intersection guidance image. The intersection guidance image provides guidance on an intersection to be possibly travelled by the host vehicle. The sign image acquisition unit acquires a direction sign image. The direction sign image is an image of a direction sign that indicates leading directions of roads connected to the intersection. The intersection enlarged view acquisition unit acquires an intersection enlarged view. The intersection enlarged view is an image providing guidance on a traveling direction of the host vehicle at a target intersection located in forward direction of the host vehicle along the guidance route, and the intersection enlarged view includes symbols indicative of facilities serving as landmarks of the target intersection. The display control unit displays, as the intersection guidance image, a direction sign image corresponding to the target intersection prior to the intersection enlarged view of the target intersection during the route guidance process which is performed by the route guidance unit.

When the route guidance unit is performing a route guidance process and the host vehicle is approaching a target intersection under the route guidance, the display control unit in the above-described configuration displays a direction sign image for the target intersection, and then displays an enlarged view of the intersection. Consequently, the above-described configuration makes it possible to switch between the display of a direction sign image at an intersection and the display of an enlarged view of the same intersection.

Further, the enlarged view of an intersection includes information about a facility serving as a landmark of the intersection. Therefore, it can be said that the enlarged view of an intersection provides more detailed information about the target intersection than the direction sign image. More specifically, as the host vehicle approaches the target intersection, the above-described configuration switches from the display of the direction sign image to the display of the enlarged view of the target intersection, which provides more detailed information about the target intersection. This reduces the possibility of a driver erroneously recognizing an irrelevant intersection as the target intersection.

The driver is also able to recognize the distance between the target intersection and the host vehicle because, for example, a display device switches to display intersection guidance image having an increased amount of information about the target intersection. This further reduces the possibility of the driver erroneously recognizing an irrelevant intersection as the target intersection.

BRIEF DESCRIPTION OF DRAWINGS

The above and other objects, features, and advantages of the present disclosure will become more apparent from the following detailed description made with reference to the accompanying drawings. In the drawings.

EMBODIMENTS FOR CARRYING OUT INVENTION

Figure 1:
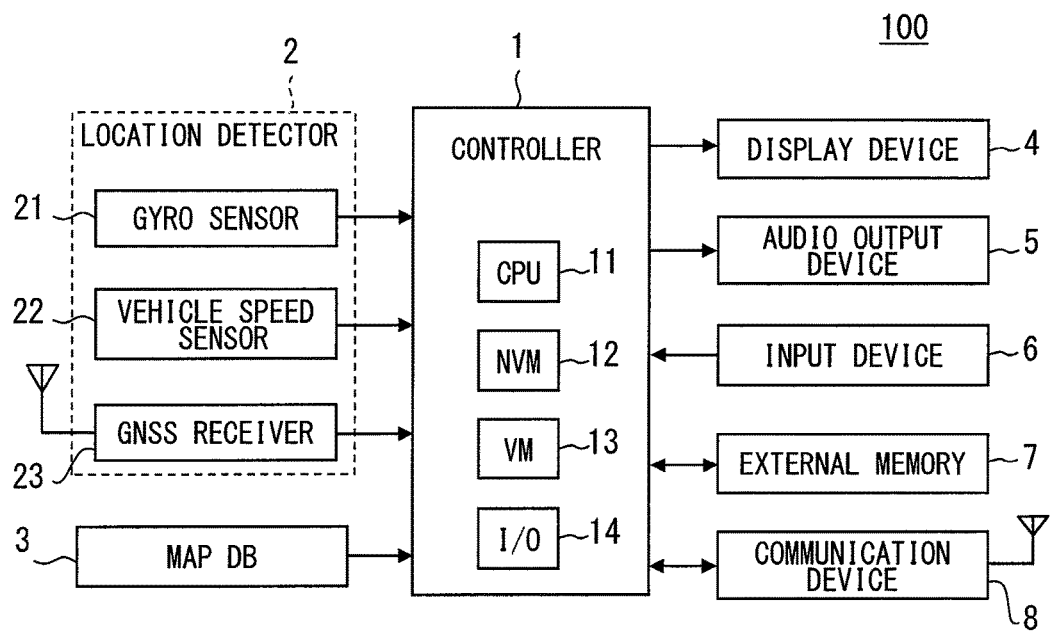
FIG. 1 is a block diagram illustrating an exemplary outline configuration of a navigation apparatus.

Exemplary embodiments of the present disclosure will now be described with reference to the accompanying drawings. FIG. 1 is a diagram illustrating an exemplary outline configuration of a navigation apparatus 100 according to the present disclosure. The navigation apparatus 100 according to the present embodiment performs functions similar to those of well-known navigation apparatus in order to search for a guidance route to a destination and provide route guidance to guide a vehicle along the guidance route. The functions will be described in detail later.

It is assumed that the navigation apparatus 100 according to the present embodiment is equipped to a vehicle. As another example, the navigation apparatus 100 may be a portable navigation apparatus that can be carried into a vehicle by a user. A vehicle to which the navigation apparatus 100 is equipped is hereinafter referred to as the host vehicle.

As illustrated in FIG. 1, the navigation apparatus 100 according to the present embodiment includes a controller 1, a location detector 2, a map database (hereinafter referred to as map DB) 3, a display device 4, an audio output device 5, an input device 6, an external memory 7, and a communication device 8. The controller 1, the location detector 2, the map DB 3, the display device 4, the audio output device 5, the input device 6, the external memory 7, and the communication device 8 are mutually communicatively connected through a well-known in-vehicle network.

The location detector 2 includes a well-known gyro sensor 21, a vehicle speed sensor 22, and a GNSS receiver 23. The GNSS receiver 23 detects a location of itself based on radio waves transmitted from a GNSS satellite used in a GNSS (Global Navigation Satellite System).

Data detected by the gyro sensor 21, the vehicle speed sensor 22, and the GNSS receiver 23, which are included in the location detector 2, are successively outputted to the controller 1. The gyro sensor 21, the vehicle speed sensor 22, and the GNSS receiver 23 have inherent detection errors, which differ from each other in characteristics. Therefore, the controller 1 complements the data detected by these sensors before use.

The location detector 2 in the present embodiment includes the gyro sensor 21, the vehicle speed sensor 22, and the GNSS receiver 23. Alternatively, the location detector 2 may include a part of the above-mentioned sensors depending on the accuracies of the sensors. Further, the location detector 2 may further include a well-known steering angle sensor and an acceleration sensor in addition to the above-mentioned sensors.

The map DB 3 is a database that stores map data. The map DB 3 is provided, for example, by a hard disk drive (HDD) or other rewritable nonvolatile storage medium. The storage medium used for the map DB 3 to store map data is not limited to a magnetic storage medium, such as a HDD, but may be an optical storage medium, such as a DVD. Further, a non-rewritable storage medium may alternatively be used for the map DB 3.

The map data includes, for example, road data indicative of connections between roads (that is, a road network), background data, text data, audio data, and image data (two dimensional image, three dimensional image, and polygon image data).

The road data includes node data and link data. The node data is related to a point (node) at which one or more roads intersect, meet, or branches. The link data is related to a road (link) that connects points indicated by the node data. The node is not only set for a point at which roads intersect, meet, or branches, but also set, for example, for a dead end of a road, a point at which a road type (described later) changes, start point or end point of a toll road, and a point indicative of a road network that is designated for the sake of expression (a point at the boundary of a zone).

The node data includes various data, such as a node ID that is a specific number assigned to each node, node coordinates (latitude and longitude), a node name, connected link IDs indicative of link IDs of all links connected to a node, and the type of intersection. The type of intersection is classified, for example, as a T-junction or a crossroad according to the shape of an intersection.

The link data includes various data, such as a link ID that is a specific number assigned to each road, a link length indicative of the length of a link, start node and end node of a link, the type of road, such as an expressway or a local road, a road width, a link orientation, a road name, the number of lanes, and a speed limit.

The link data also includes data indicating whether or not a direction sign is installed on a link, coordinates of a location where a direction sign is installed on a link (also referred to as the installation location), and information (for example, node ID) about a node related to the direction sign. As another example, the data related to a direction sign (referred to as the direction sign data) may be included in the node data. In the present embodiment, a direction sign installed at an intersection is also included in the link data while the point of connection between a node and a link, which corresponds to the intersection, is regarded as the installation location of the intersection.

The background data is organized by handling, for example, mapped facilities and land features as data associated with coordinates on the map. Phone numbers, addresses, and other data about the facilities are stored in association with the facilities. The text data is used to display, for example, a location name, a facility name, and a road name on a map and stored in association with coordinate data about a display position of the text data. The audio data is used to output audio signal. The image data is used to draw a map image or a guidance image that is displayed during a route guidance process. A direction sign image and an enlarged view of an intersection, which will be described later, are generated using the image data.

The display device 4 displays text and images based on input from the controller 1 in order to notify a user of various kinds of information. The display device 4 is disposed, for example, at the center of an instrument panel or within a combination meter in front of a driver's seat. The display device 4 is capable of displaying, for example, full-color images and may be provided by, for example, a liquid-crystal display, an organic EL display, or a plasma display. The audio output device 5, which is provided by, for instance, a loudspeaker, may output audio guidance in compliance with an instruction from the controller 1.

The input device 6 is provided by a touch panel that is integral with a display panel attached, for example, to the display device 4. The user operates the input device 6 to instruct the controller 1 to execute various functions. For example, the user can issue an instruction for setting a destination or performing or terminating a route guidance process.

The present embodiment uses a capacitive touch panel as the input device 6. As another example, a pressure-sensitive touch panel may be used as the input device 6. Further, the input device 6 is not limited to a touch panel, but may be provided by a mechanical switch or a voice recognition device that enables the user to input an audio instruction. In another example, a combination of these devices may be used as the input device 6.

The external memory 7 may be provided by a well-known rewritable storage medium. A removable memory having a relatively small storage capacity (such as an SD card) may be used as the external memory 7. The communication device 8 includes a transmission/reception antenna and communicates with an external terminal through a communication network such as a mobile telephone network. Here, it is assumed that the communication device 8 is provided, for instance, by a communication module used in a well-known third-generation mobile communication system. As another example, a well-known DCM (Data Communication Module) and various other types of in-vehicle communication modules may be used as the communication device 8.

The controller 1, which is provided by a computer, includes a well-known central processing unit (CPU) 11, a read-only memory (ROM) or an electrically erasable programmable read-only memory (EEPROM), a flash memory or other nonvolatile memory (NVM) 12, a random-access memory (RAM) or other volatile memory (VM) 13, an input/output (I/O) device 14, and a bus line (not shown) that connects the above-mentioned components. The nonvolatile memory 12 stores programs and data that are used to perform various processes.

Figure 2A:
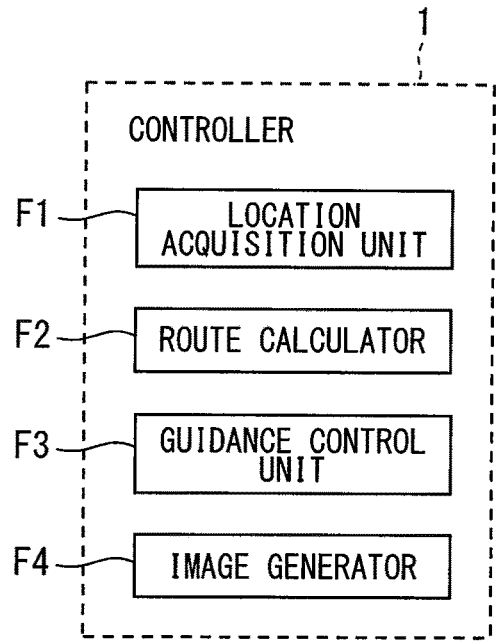
FIG. 2A is a functional block diagram illustrating an outline configuration of a controller of the navigation apparatus.

The controller 1 performs various processes based on various information inputted from the location detector 2, the input device 6, and the communication device 8, and programs stored in the nonvolatile memory 12. More specifically, the controller 1 includes functional blocks illustrated in FIG. 2A, namely, a location acquisition unit F1, a route calculator F2, a guidance control unit F3, and an image generator F4.

The location acquisition unit F1 detects a current location of a vehicle (hereinafter referred to as the vehicle location) based on signals inputted from the gyro sensor 21, the vehicle speed sensor 22, and the GNSS receiver 23. As mentioned earlier, the GNSS receiver 23 and other sensors included in the location detector 2 have inherent detection errors that differ from each other in characteristics. Therefore, the location acquisition unit F1 detects the vehicle location 1 while complementing the data detected by the sensors. The vehicle location is detected successively (for example, at 100 millisecond intervals). The vehicle location is expressed, for instance, by latitude and longitude. In another example, the location detector 2 may perform a computation process to identify the vehicle location and allow the location acquisition unit F1 to acquire the result of computation, that is, the vehicle location. The location acquisition unit F1 corresponds to a host vehicle location acquisition unit.

The route calculator F2 uses the Dijkstra's algorithm or other well-known search method to calculate a recommended route from a departure point, such as the current vehicle location, to a destination. The recommended route is calculated in such a manner as to meet predefined conditions or driver-designated conditions such as distance priority or time priority. Information about the recommended route calculated by the route calculator F2 is outputted to the guidance control unit F3. If a driver determines that the recommended route calculated by the route calculator F2 is not suitable as the planned route (this route is hereinafter referred to as the guidance route), the driver can change the route calculation conditions and have the route calculator F2 recalculate the route.

The guidance control unit F3 performs a route guidance process of guiding the driver along the guidance route by using the vehicle location acquired by the location acquisition unit F1 and the map data included in the map DB 3. Here, the guidance route is a recommended route that is calculated by the route calculator F2 and is set as the target route the driver is supposed to take.

During the route guidance process, the guidance control unit F3 provides guidance for traveling along the guidance route by controlling the display device 4 to successively display a map image indicative, for instance, of the guidance route and the vehicle location and controlling the audio output device 5 to successively output guidance voice messages for guiding the driver to the destination.

When the guidance route is not set, the guidance control unit F3 performs a process for showing, to the driver, a map of an area around the current vehicle location acquired from the location acquisition unit F1. The process executed by the guidance control unit F3 when the guidance route is not set is referred to as the route non-guidance process for distinguishing from the aforementioned route guidance process. The guidance control unit F3 corresponds to a route guidance unit.

Figure 2B:
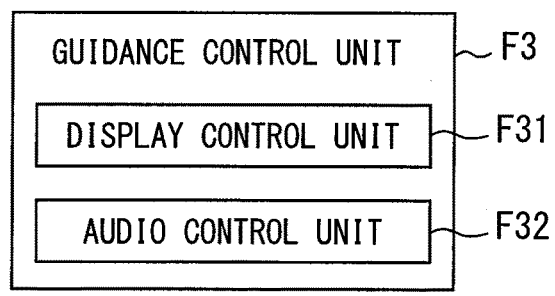
FIG. 2B is a functional block diagram illustrating an outline configuration of a guidance control unit.

As illustrated in FIG. 2B, the guidance control unit F3 is subdivided into functional blocks in order to perform the above-mentioned process. The functional blocks include a display control unit F31 and an audio control unit F32. The display control unit F31 exercises control, for instance, to change the image to be displayed on the display device 4. The audio control unit F32 controls the audio output device 5 to output a voice (including a simple sound). The guidance control unit F3 defines the guidance, which is to be provided to the driver, from the map data correlated to the guidance route and the vehicle location acquired from the location acquisition unit F1, and changes the image to be displayed on the display device 4 using the display control unit F31 based on the defined guidance.

Text and images to be displayed on the display device 4 by the display control unit F31 are acquired from the map DB 3 and the image generator F4. The guidance control unit F3 instructs the image generator F4 to generate an image based on the defined guidance. The display control unit F31 then controls the display device 4 to display the images and text acquired from the map DB 3 and the image generator F4 in a predetermined layout pattern.

For example, the display control unit F31 displays a peripheral road map image on a user-designated scale with the host vehicle displayed at the center of a screen. Further, the display control unit F31 displays an intersection guidance image over the aforementioned peripheral road map image. The intersection guidance image is a direction sign image, an intersection enlarged view, or other image generated by the image generator F4 to provide information about an intersection that the host vehicle may pass. The intersection that the host vehicle may pass is an intersection existing in the traveling direction of the host vehicle or an intersection located on the guidance route. The intersection existing in the traveling direction of the host vehicle includes an intersection existing in the traveling direction of the host vehicle, and also includes an intersection that the host vehicle passes when the host vehicle travels on a currently selected road without making a right turn or a left turn.

Figure 2C:
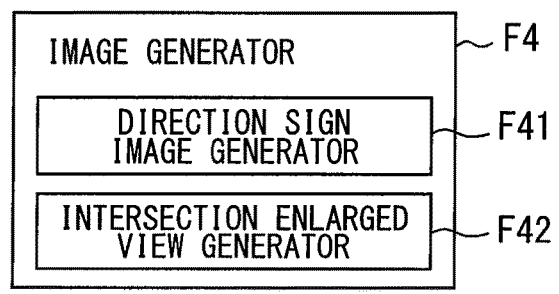
FIG. 2C is a functional block diagram illustrating an outline configuration of an image generator.

The image generator F4 has an image generation function of generating images to be displayed on the display device 4. For example, the function of image generation is implemented by a direction sign image generator F41 and an intersection enlarged view generator F42, which are included in the image generator F4 as illustrated in FIG. 2C.

The direction sign image generator F41 generates a direction sign image by using the road data and image data included in the map data. The direction sign image shows the shape of the intersection in association with possible destinations to which roads connected at an intersection lead. The direction sign image will now be described with reference to FIGS. 3 and 4.

Figure 3:
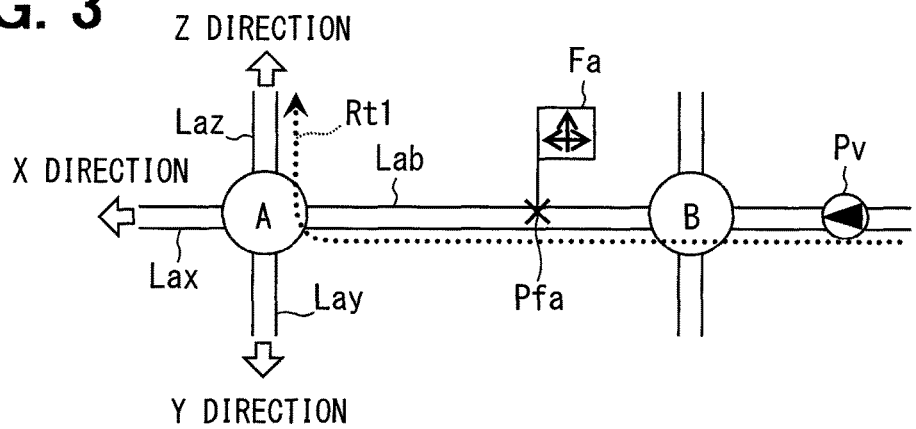
FIG. 3 is a schematic diagram illustrating a road network existing in the traveling direction of a host vehicle.

FIG. 3 is a schematic diagram illustrating a road network existing in the traveling direction of the host vehicle. FIG. 3 illustrates two intersections A and B. The road Lab connects the intersection A with the intersection B. Roads Lax, Lay, Laz are connected to the intersection A, the road Lax leads in X direction, the road Lay leads in Y direction, and the road Laz leads in Z direction. It is assumed that the intersection A is shaped like a crossroad where a road formed of the roads Lab, Lax perpendicularly intersects with a road formed of the roads Lay, Laz.

A direction sign Fa for the intersection A is installed at a point Pfa on the road Lab. A mark Pv indicates the current vehicle location and the traveling direction of the vehicle. The traveling direction is indicated by a vertex of a isosceles triangle. A dotted line arrow Rt1 will be described later.

Figure 4:
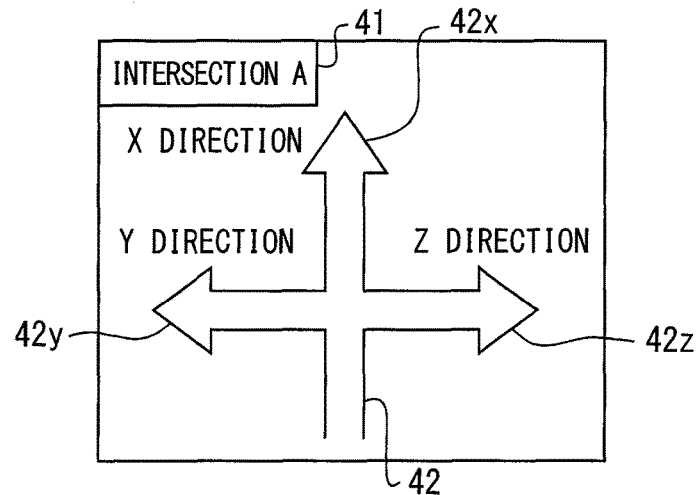
FIG. 4 is a diagram illustrating an example of a direction sign image.

FIG. 4 illustrates an example of a direction sign image for the intersection A that is to be viewed by the vehicle passenger when the vehicle moves from the current vehicle location to the intersection A as illustrated in FIG. 3. As illustrated in FIG. 4, the direction sign image includes the name 41 of the intersection A and an intersection pattern 42 indicative of the shape of the intersection A. The intersection pattern 42 may be shaped based on an intersection type included in the node data about a node corresponding to the intersection A in the road data.

Arrows 42$x$, 42$y$, 42$z$ included in the intersection pattern 42 correspond to the respective roads Lax, Lay, Laz, and respectively represent the roads Lax, Lay, Laz on the assumption that the upward direction is set as the travelling direction of the host vehicle. In other words, the arrow 42$x$ corresponds to the road Lax on which the host vehicle travels when the host vehicle moves straight forward passing through the intersection A. This indicates that the host vehicle moves in the X direction when the host vehicle passes through the intersection A in the direction of the arrow 42$x$. The arrow 42$y$ corresponds to the road Lay on which the host vehicle travels when the host vehicle turns left at the intersection A. This indicates that the host vehicle moves in the Y direction when the host vehicle travels in the direction of the arrow 42$y$ from the intersection A. The arrow 42$z$ corresponds to the road Laz on which the host vehicle travels when the host vehicle turns right at the intersection A. This indicates that the host vehicle moves in the Z direction when the host vehicle travels in the direction of the arrow 42z from the intersection A.

The direction sign image generator F41 generates the aforementioned direction sign image in compliance with an instruction from the guidance control unit F3. When predetermined conditions (hereinafter referred to as the sign generation conditions) are satisfied, the guidance control unit F3 in the present embodiment instructs the direction sign image generator F41 to generate the direction sign image during the route non-guidance process or the route guidance process. For example, when the distance between the host vehicle and the installation location of a direction sign existing in the traveling direction of the host vehicle becomes equal to a predetermined distance Df1 (hereinafter referred to as the sign generation distance), the guidance control unit F3 outputs an instruction for generating a direction sign image for the intersection related to the direction sign.

For example, suppose that the sign generation distance Df1 is set to 300 meters. The sign generation distance Df1 may be alternatively set to 200 meters, 500 meters, or other value determined by the traveling speed of the host vehicle. When setting the sign generation distance Df1 based on the traveling speed of the host vehicle, setup should be performed so that the sign generation distance Df1 increases with an increase in the traveling speed.

Figure 5:
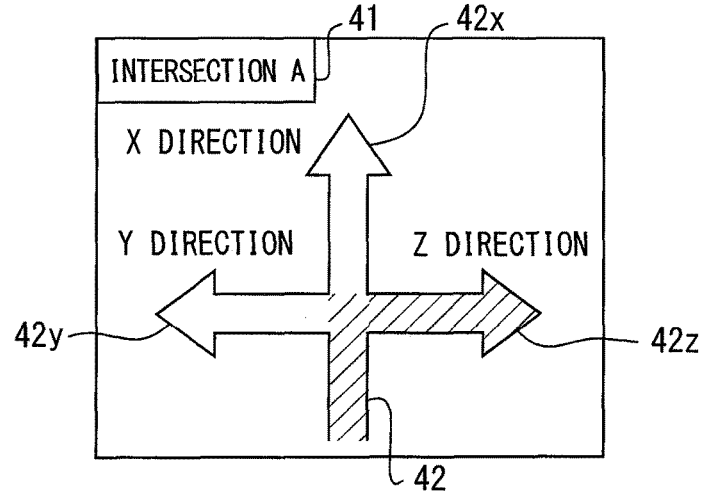
FIG. 5 is a diagram illustrating an example of a direction sign image displayed during a route guidance process.

During the route guidance process, the direction sign image generator F41 generates a direction sign image illustrated, for instance, in FIG. 5. The direction sign image illustrated in FIG. 5 is generated when the guidance route is set as the dotted line arrow Rt1 in FIG. 3. When the guidance route is set as the dotted line arrow Rt1, the host vehicle needs to turn right at the intersection A and travel on the road Laz, which leads in the Z direction.

Consequently, the direction sign image generated during route guidance is presented so as to display the arrow 42z in a manner different from the other arrows 42x, 42y in order to let the driver recognize the necessity of turning right in the Z direction (see FIG. 5). For example, the arrow 42z should be displayed in a blinking manner or in a color different from the remaining arrows 42x, 42y. The direction sign image generator F41 corresponds to an example of a direction sign acquisition unit.

The intersection enlarged view generator F42 generates an intersection enlarged view that is obtained by superimposing a mark indicative of a facility serving as a landmark for a target intersection over an image showing an enlarged view of the target intersection. The target intersection is an intersection that has not yet been passed through and a left or right turn is required at the intersection to travel along the guidance route or an intersection having a complicated shape. The guidance control unit F3 may distinguish the target intersection from remaining intersections (hereinafter referred to as the non-target intersections) under predefined rules.

When the guidance route is set, for example, as indicated by the dotted line arrow Rt1 in FIG. 3, the intersection A at which a right turn is required is the target intersection, and the intersection B at which neither the left turn nor the right turn is required is a non-target intersection.

Figure 6:
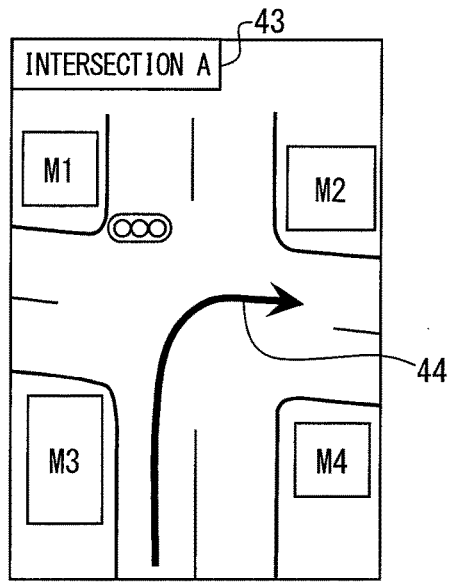
FIG. 6 is a diagram illustrating an example of an enlarged view of an intersection.

FIG. 6 illustrates an example of an intersection enlarged view generated by the intersection enlarged view generator F42. FIG. 6 presents an enlarged view of the intersection A that is generated to indicate the target intersection when the guidance route is set as indicated by the dotted line arrow Rt1 in FIG. 3. As illustrated in FIG. 6, the intersection enlarged view includes the name 43 of the intersection A and a direction arrow 44 indicative of the path to take at the target intersection. Here, the guidance route involves a right turn at the target intersection A. Therefore, the intersection enlarged view in FIG. 6 also shows the direction arrow 44 that suggests a right turn at the target intersection A. The shape of the intersection A illustrated in the intersection enlarged view is a schematic representation of the actual shape of the intersection A.

Marks M1-M4 in FIG. 6 represent facilities that serve as landmarks of the target intersection A. The facilities serving as the landmarks of the target intersection may be extracted by a method disclosed in Patent Literature 2. Displaying the marks M1-M4 indicative of the facilities serving as the landmarks of the target intersection A at the target intersection which requires a left or right turn reduces the possibility of the driver erroneously recognizing an irrelevant intersection as the target intersection A even though the irrelevant intersection exists near the target intersection A.

The intersection enlarged view is also generated in compliance with an instruction from the guidance control unit F3. When the distance between the host vehicle and the target intersection becomes equal to a predetermined distance (hereinafter referred to as the enlarged view generation distance) Dg1, the guidance control unit F3 issues an instruction for generating an intersection enlarged view of the target intersection. It is assumed, for example, that the enlarged view generation distance Dg1 is set to 100 meters. The enlarged view generation distance Dg1 may alternatively be set to, for example, 150 meters, 200 meters, or other appropriately designed value. The intersection enlarged view generator F42 corresponds to an example of an intersection enlarged view acquisition unit.

The direction sign image and the intersection enlarged view have been described in detail. In addition to the direction sign image and the intersection enlarged view, the image generator F4 also generates, for example, an image of a road map showing an area around the current vehicle location (hereinafter referred to as the peripheral road map image) and an image of a lane list providing lane information about a link on which the host vehicle traveling. The lane list may be displayed during the route guidance process and the route non-guidance process. During the route guidance process, an image indicating the lane required to be travelled under the guidance route is displayed in a manner different from other lanes.

Conditions under which the display control unit F31 displays the direction sign image or the intersection enlarged view will now be described. First of all, it should be noted that the intersection enlarged view is an image that provides guidance to the driver how to travel at the target intersection. Therefore, the intersection enlarged view is neither generated nor displayed during the route non-guidance process for which the target intersection is not set. In other words, only during the route guidance process, the intersection enlarged view is generated, and may be or may not be displayed to the driver.

The direction sign image is generated not only for the target intersection but also for an intersection at which a direction sign is installed. Therefore, the direction sign image can be displayed during the route guidance process and the route non-guidance process.

During the route guidance process, both the direction sign image and the intersection enlarged view can be generated and displayed. When simultaneously displaying both the direction sign image and the intersection enlarged view, it is not efficient from the viewpoint of a limited display space of the display device and the direction sign image and the intersection enlarged view may have the same information causing information redundancy.

In the route non-guidance process, display conditions need to be defined only for the direction sign image. In the route guidance process, in addition to the display conditions of the direction sign image, display conditions for the intersection enlarged view also need to be defined exclusively from the direction sign image (for example, either the direction sign image or the intersection enlarged view is selectively displayed). Consequently, the present embodiment controls the image to be displayed on the display device 4 by applying different rules to the route non-guidance process and the route guidance process.

First of all, rules R11, R12 applied to the route non-guidance process will be described below.

Rule R11: The display of the direction sign image starts when the distance between the host vehicle and the installation location of the direction sign reaches a predetermined distance Df2 (hereinafter referred to as the sign display distance).

Rule R12: The display of the direction sign image terminates when the host vehicle passes through or has no possibility to pass through an intersection related to the direction sign image.

It is assumed in the present embodiment that the aforementioned sign display distance Df2 is set to 300 meters. The sign display distance Df2 may be designed as appropriate, as is the case with the sign generation distance Df1. It is assumed that the sign display distance Df2 is equal to or shorter than the sign generation distance Df1 and is longer than a later-described enlarged view display distance Dg2. Meanwhile, the aforementioned case where the host vehicle has no possibility to pass through a certain intersection may be a case where, for example, the host vehicle turns left or right at another intersection positioned prior to the certain intersection.

Next, rules R21 to R26 applied to the route guidance process will be described.

Rule R21: The display of the direction sign image starts when the distance between the host vehicle and the installation location of the direction sign reaches the sign display distance Df2.

Rule R22: The direction sign image for a non-target intersection existing within a predetermined distance (hereinafter referred to as the sign display prohibition distance) Dh from a target intersection will not be displayed despite the rule R21.

Rule R23: The display of the intersection enlarged view starts when the distance between the host vehicle and the target intersection reaches a predetermined distance (hereinafter referred to as the enlarged view display distance) Dg2.

Rule R24: When the direction sign image for the target intersection is displayed in a situation where the rule R23 is applied, the display of the direction sign image terminated and the display of the intersection enlarged view is started.

Rule R25: The display of the intersection enlarged view terminates when the host vehicle passes through or has no possibility to pass through the target intersection.

Rule R26: The display of the direction sign image for a non-target intersection terminates when the host vehicle passes through the non-target intersection related to the direction sign image or has no possibility to pass through the non-target intersection related to the direction sign image.

It is assumed in the present embodiment that the aforementioned enlarged view display distance Dg2 is set to, for example, 100 meters. The enlarged view display distance Dg2 may be designed as appropriate, as is the case with the enlarged view generation distance Dg1. It is assumed that the enlarged view display distance Dg2 is a positive value equal to or shorter than the enlarged view generation distance Dg1 and is a value smaller than the sign display distance Df2.

Next, a display control process executed by the display control unit F31 to control the image to be displayed on the display device 4 will be described. As mentioned earlier, among the route non-guidance process and the route guidance process, rules by which the direction sign image and other intersection guidance images are displayed are different from one another. Therefore, for the sake of convenience, the display control process within the route non-guidance process and the display control process within the route guidance process will be separately described.

Figure 7:
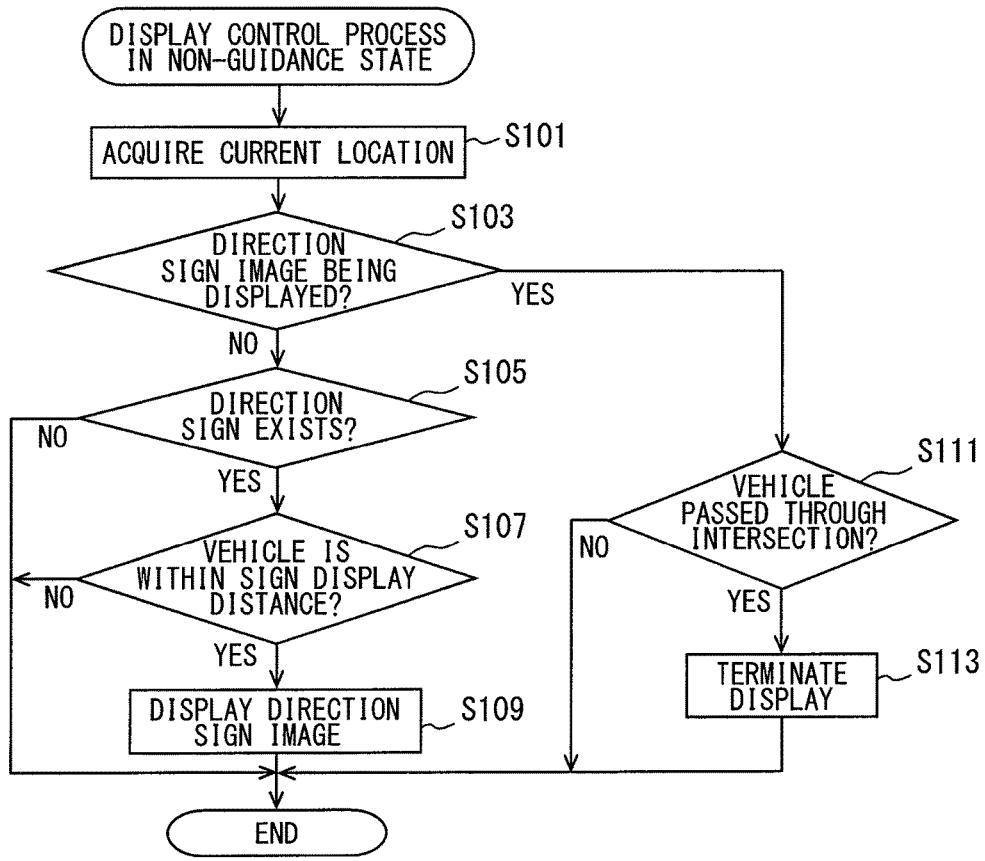
FIG. 7 is a flowchart illustrating an example of a display control process where no guidance is provided.

First of all, an example of the display control process in the route non-guidance process (hereinafter referred to as the non-guidance display control process) will be described with reference to the flowchart of FIG. 7. The process illustrated in the flowchart of FIG. 7 starts when, for example, an ignition switch (not shown) is turned on to supply electrical power to the navigation apparatus 100, and is repeatedly executed (for example, at 100 millisecond intervals) when there is no guidance route being set.

In step S101, the current vehicle location is acquired. Upon completion of step S101, process proceeds to step S103. In step S103, a check is performed to determine whether a direction sign image is displayed. If a direction sign image is displayed, the query in step S103 is answered "YES" and process proceeds to step S111. When no direction sign image is displayed, the query in step S103 is answered "NO" and process proceeds to step S105.

In step S105, a check is performed to determine whether a direction sign is installed within a predetermined distance (for example, 500 meters) from the current location in the traveling direction of the host vehicle. Whether a direction sign is installed can be determined by referencing the link data. The link data to be referenced may be the data about a link on which the host vehicle is currently traveling, the data about a link that is connected to the currently travelling link and located in the traveling direction of the host vehicle, and the data about a link connected to the above-mentioned links.

If a direction sign is installed within the predetermined distance in the traveling direction of the host vehicle, the query in step S105 is answered "YES" and process proceeds to step S107. When no direction sign is installed within the predetermined distance in the traveling direction of the host vehicle, the query in step S105 is answered "NO" and the process illustrated in the flowchart is ended.

In step S107, a check is performed in compliance with the rule R11 to determine whether the distance between the host vehicle and the installation location of the direction sign detected in step S105 is equal to or shorter than the sign display distance Df2. If the distance between the host vehicle and the installation location of the direction sign detected in step S105 is within the sign display distance Df2, the query in step S107 is answered "YES" and process proceeds to step S109. When the distance between the host vehicle and the installation location of the direction sign detected in step S105 longer than the sign display distance Df2, the query in step S107 is answered "NO" and the process illustrated in the flowchart is ended. A point positioned on a road between an intersection and the host vehicle and positioned where the distance between the host vehicle and the installation location of a direction sign reaches the sign display distance Df2 may be referred to as a direction sign display point.

In step S109, the display device 4 displays a direction sign image corresponding to the direction sign detected in step S105. Upon completion of step S109, the process illustrated in the flowchart is ended. As mentioned earlier, the direction sign image should be generated by the image generator F4 when the sign generation conditions are satisfied.

In step S111, a check is performed to determine whether the host vehicle has passed through an intersection related to the currently displayed direction sign image. When the vehicle has passed through the intersection, the query in step S111 is answered "YES" and process proceeds to step S113. When the vehicle has not passed through the intersection, the query in step S111 is answered "NO" and the process illustrated in the flowchart is ended. In other words, the direction sign image remains being displayed until the vehicle passes through the intersection. In step S113, the display of the currently displayed direction sign image is terminated, and the process illustrated in the flowchart is ended.

Figure 8A:
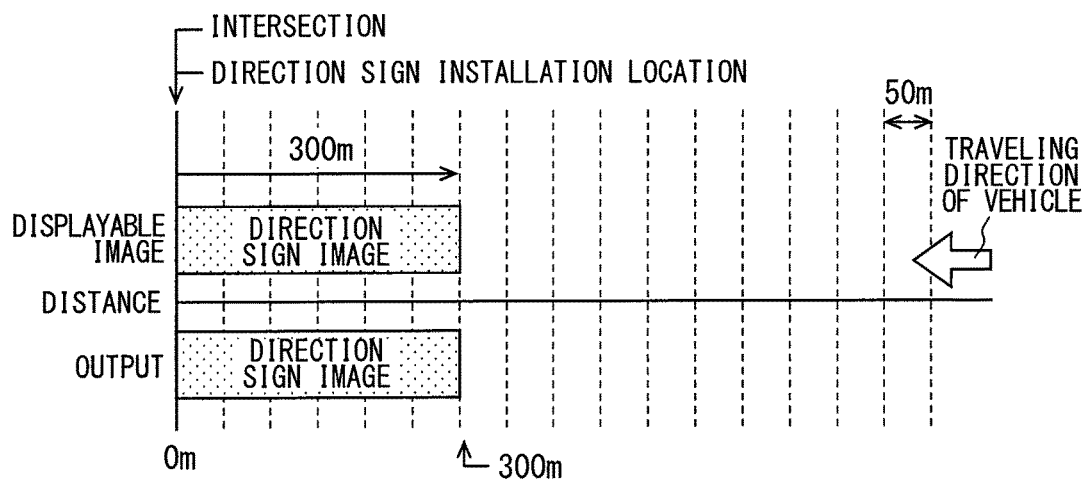
FIG. 8A is a diagram illustrating an operation that is performed by the navigation apparatus during a route non-guidance process where no route guidance is provided.
Figure 8B:
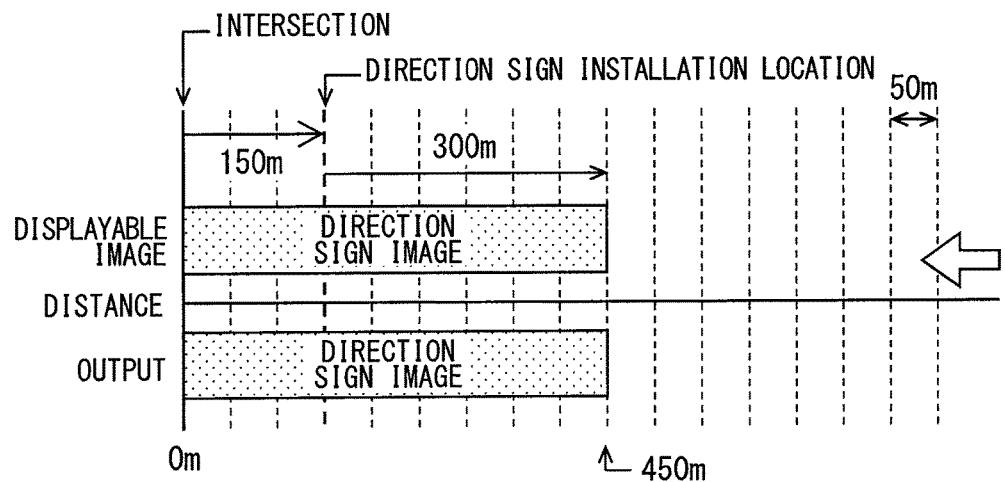
FIG. 8B is a diagram illustrating an operation that is performed by the navigation apparatus during the route non-guidance process.

An operation performed by the guidance control unit F3 (mainly by the display control unit F31) during the above-described route non-guidance process will now be described with reference to FIGS. 8A and 8B. In FIGS. 8A and 8B, an outline arrow indicates the traveling direction of the host vehicle, and the horizontal axis indicates the distance from an intersection.

FIG. 8A illustrates an example of an operation that is performed when a direction sign is installed at an intersection. In FIG. 8A, the outline arrow indicates the traveling direction of the host vehicle. In this instance, the installation location of the direction sign coincides with the location of the intersection. Therefore, the guidance control unit F3 generates a relevant direction sign image at a point that is apart from the intersection by the sign generation distance Df1 (set to 300 meters in the current example) in the direction toward the host vehicle. In other words, the display of the direction sign image can be started at a point that is apart from the intersection by the sign generation distance Df1 (set to 300 meters in the current example) prior to reaching the intersection.

Then, in compliance with the rule R11, the display control unit F31 starts displaying the direction sign image when the distance between the host vehicle and the intersection reaches the sign display distance Df2 (set to 300 meters in the current example) (step S109). It is assumed in the present embodiment that the sign generation distance Df1 is set equal to the sign display distance Df2. The sign generation distance Df1 and the sign display distance Df2 may also be set to be different from one other. The sign generation distance Df1 and the sign display distance Df2 are acceptable as far as Df1≥Df2.

FIG. 8B illustrates an example of an operation that is performed when a direction sign is installed at a distance (for example, 150 meters) from an intersection related to the direction sign. In FIG. 8B, the outline arrow indicates the traveling direction of the host vehicle. In this instance, the guidance control unit F3 generates a relevant direction sign image at a point that is apart from the installation location of the direction sign by the sign generation distance Df1 in the direction toward the host vehicle. Then, in compliance with the rule R11, the display control unit F31 starts displaying the direction sign image at a point where the distance between the host vehicle and the direction sign installation location reaches the sign display distance Df2 (step S109). In this example, the direction sign is installed at a point apart from the intersection by a distance of 150 meters in the direction toward the host vehicle. As a result, the display of the direction sign image starts at a point 450 meters away from the intersection.

Figure 9:
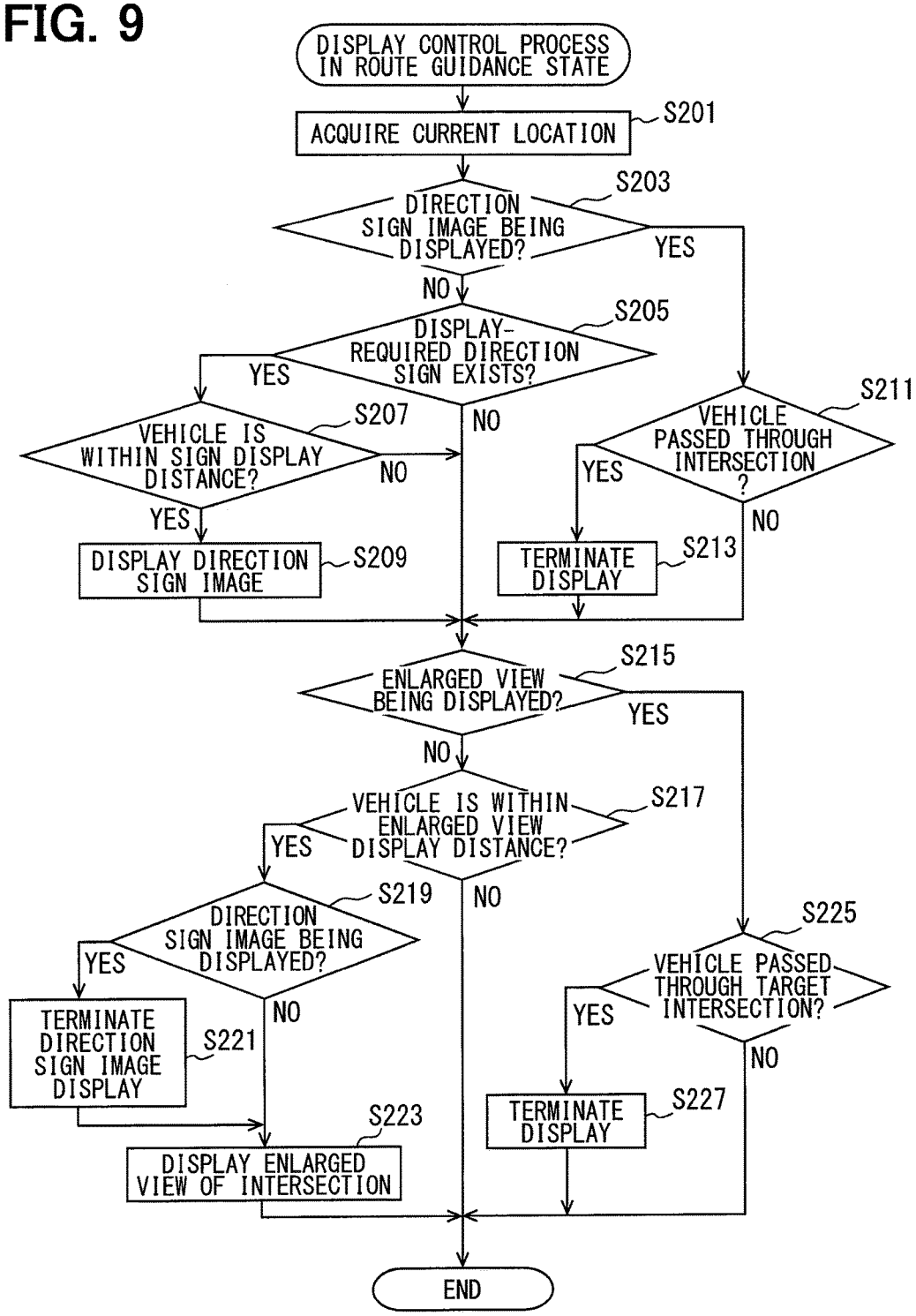
FIG. 9 is a flowchart illustrating an example of a display control process during a route guidance process.

The following will describe an example of the display control process in the route guidance process (hereinafter referred to as the route guidance display control process) with reference to the flowchart of FIG. 9. The process illustrated in the flowchart of FIG. 9 may start when the ignition switch (not shown) is turned on to supply electrical power to the navigation apparatus 100, and is repeatedly performed (for example, at 100 millisecond intervals) when the guidance route being set.

In step S201, the current vehicle location is acquired. Upon completion of step S201, process proceeds to step S203. In step S203, a check is performed to determine whether a direction sign image is displayed. When a direction sign image is displayed, the query in step S203 is answered "YES" and process proceeds to step S211. When no direction sign image is displayed, the query in step S203 is answered "NO" and process proceeds to step S205.

In step S205, a check is performed to determine whether the direction sign corresponding to the direction sign image to be displayed is installed within a predetermined distance from the current location in the traveling direction of the host vehicle. Whether a direction sign is installed can be determined by referencing the link data, similar to the step S105 in FIG. 7.

Whether to display a direction sign image of an intersection may be determined in compliance with the rule R22 by checking whether the intersection corresponding to the direction sign image is positioned within the sign display prohibition distance Dh from the target intersection. More specifically, when a direction sign installed corresponding to a non-target intersection is positioned within the sign display prohibition distance Dh from the target intersection, the direction sign image corresponding to this non-target intersection should not be displayed. Meanwhile, when a distance between the direction sign installed corresponding to a non-target intersection and the target intersection is longer than the display prohibition distance, the direction sign image corresponding to this direction sign should be displayed.

When the direction sign to be displayed is installed within the predetermined distance in the traveling direction of the host vehicle, the query in step S205 is answered "YES" and process proceeds to step S207. When the location where the direction sign is installed is not within the predetermined distance in the traveling direction of the host vehicle, the query in step S205 is answered "NO" and process proceeds to step S215.

In step S207, a check is performed in compliance with the rule R21 to determine whether the distance between the host vehicle and the installation location of the direction sign detected in step S205 is within the sign display distance Df2. When the distance between the host vehicle and the installation location of the direction sign detected in step S205 is within the sign display distance Df2, the query in step S207 is answered "YES" and process proceeds to step S209. When the distance between the host vehicle and the installation location of the direction sign detected in step S205 is not within the sign display distance Df2, the query in step S207 is answered "NO" and process proceeds to step S215.

In step S209, the display device 4 displays a direction sign image corresponding to the direction sign detected in step S205. Upon completion of step S209, process proceeds to step S215. In step S211, a check is performed to determine whether the vehicle passed through an intersection related to the currently displayed direction sign image. When the vehicle passed through the intersection, the query in step S211 is answered "YES" and process proceeds to step S213. When the vehicle does not pass through the intersection, the query in step S211 is answered "NO" and process proceeds to step S215. In step S213, the display of the direction sign image is terminated in compliance with the rule R26. Upon completion of step S213, process proceeds to step S215.

In step S215, a check is performed to determine whether an intersection enlarged view is being displayed. When an intersection enlarged view is being displayed, the query in step S215 is answered "YES" and process proceeds to step S225. When no intersection enlarged view is displayed, the query in step S215 is answered "NO" and process proceeds to step S217.

In step S217, a check is performed in compliance with the rule R23 to determine whether the distance between the host vehicle and the target intersection is within the enlarged view display distance Dg2. When the distance between the host vehicle and the target intersection is within the enlarged view display distance Dg2, the query in step S217 is answered "YES" and process proceeds to step S219. When the distance between the host vehicle and the target intersection is not within the enlarged view display distance Dg2, the query in step S217 is answered "NO" and the process illustrated in the flowchart is ended.

In step S219, a check is performed to determine whether a direction sign image is being displayed. When a direction sign image is being displayed, the query in step S219 is answered "YES" and process proceeds to step S221. When no direction sign image is being displayed, the query in step S219 is answered "NO" and process proceeds to step S223.

In step S221, the display of the direction sign image is terminated in compliance with the rule R24. Upon completion of step S221, process proceeds to step S223. In step S223, the intersection enlarged view of the target intersection is displayed. Upon completion of step S223, the process illustrated in the flowchart is ended. When steps S219, S221, and S223 are sequentially performed in the order of S219, S221, and S223, the displayed direction sign image is replaced by the intersection enlarged view.

In step S225, a check is performed to determine whether the vehicle has passed through the target intersection. When the vehicle has passed through the target intersection, the query in step S225 is answered "YES" and process proceeds to step S227. When the vehicle has not passed through the target intersection, the query in step S225 is answered "NO" and the process illustrated in the flowchart is ended. In step S227, the display of the intersection enlarged view terminates in compliance with the rule R25. Upon completion of step S227, the process illustrated in the flowchart is ended.

It is noted that a flowchart or the processing of the flowchart in the present disclosure includes sections (also referred to as steps), each of which is represented, for instance, as S101. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 10A:
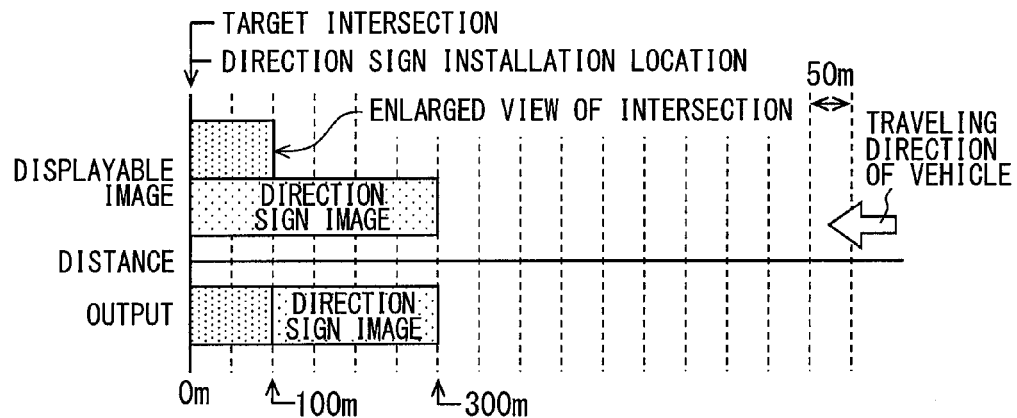
FIG. 10A is a diagram illustrating an operation that is performed by the navigation apparatus during a route guidance process.
Figure 10B:
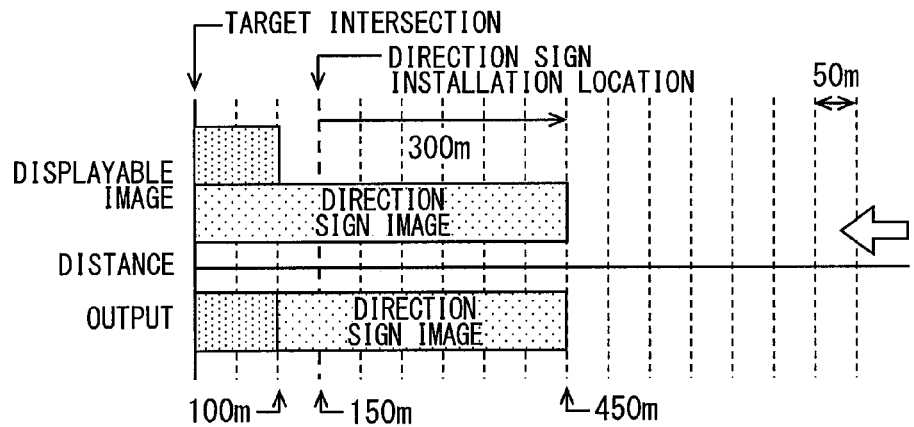
FIG. 10B is a diagram illustrating an operation that is performed by the navigation apparatus during a route guidance process.
Figure 10C:
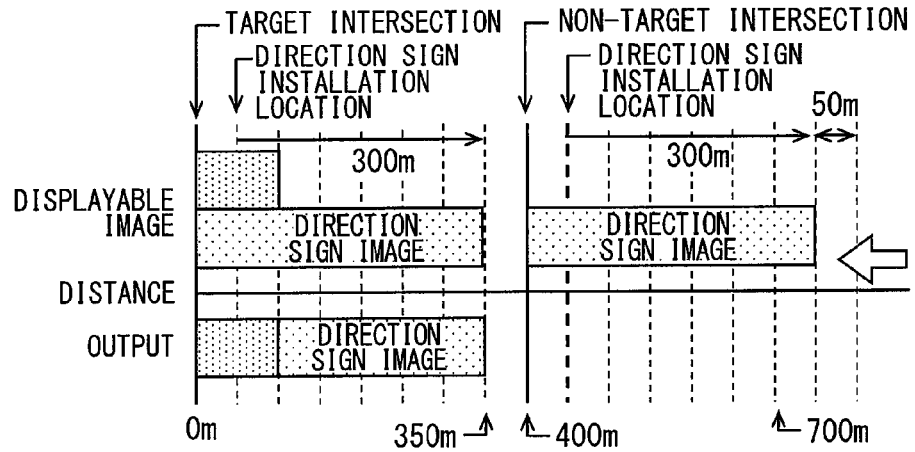
FIG. 10C is a diagram illustrating an operation that is performed by the navigation apparatus during a route guidance process.

A concept of an operation performed by the guidance control unit F3 (mainly by the display control unit F31) during the above-described route guidance process will now be described with reference to FIGS. 10A to 10C. FIGS. 10A to 10C each illustrate an example of an operation that is performed when the host vehicle approaches a target intersection where a direction sign is installed.

FIG. 10A illustrates a case where a direction sign is installed at a target intersection. In FIG. 10A, the outline arrow indicates the traveling direction of the host vehicle. In this instance, the installation location of the direction sign coincides with the location of the intersection. Therefore, the guidance control unit F3 generates the direction sign image of the target intersection at a point apart from the direction sign installation location by the sign generation distance Df1 (set to 300 meters in the current example). Herein, the direction sign installation location is the same with the target intersection. Thus, the direction sign image of the target intersection is in a display-prepared state. Then, in compliance with the rule R21, the display control unit F31 starts displaying the direction sign image at a point where the distance between the host vehicle and the target intersection reaches the sign display distance Df2 (set to 300 meters in the current example) (step S209).

When the host vehicle further approaches the target intersection and the distance between the host vehicle and the target intersection reaches the enlarged view generation distance Dg1 (set to 100 meters in the current example), the guidance control unit F3 controls the intersection enlarged view generator F42 to generate an intersection enlarged view of the target intersection. In other words, the display of the intersection enlarged view can be started at a point that is at the enlarged view generation distance Dg1 (set to 100 meters in the current example) before the target intersection. Further, when the distance between the host vehicle and the target intersection reaches the enlarged view display distance Dg2 (set to 100 meters in the current example), the display control unit F31 switches from the display of the direction sign image to the display of the intersection enlarged view in compliance with the rule R24 (steps S221 and S223).

It is assumed in the present embodiment that the enlarged view generation distance Dg1 is set equal to the enlarged view display distance Dg2. The enlarged view generation distance Dg1 and the enlarged view display distance Dg2 may be set to be different from one another. The enlarged view generation distance Dg1 and the enlarged view display distance Dg2 are acceptable as far as Dg1≥Dg2.

FIG. 10B illustrates an example of an operation that is performed when a direction sign is installed at a distance (for example, 150 meters) from a target intersection. In FIG. 10B, the outline arrow indicates the traveling direction of the host vehicle. In this instance, the guidance control unit F3 generates a relevant direction sign image at a point that is at the sign generation distance Df1 from the installation location of the direction sign, and then, in compliance with the rule R21, starts displaying the direction sign image at a point where the distance between the host vehicle and the direction sign installation location reaches the sign display distance Df2 (step S209). Here, the direction sign is installed at a distance of 150 meters from the intersection. As a result, the display of the direction sign image starts at a point 450 meters away from the intersection.

When the host vehicle further approaches the target intersection and the distance between the host vehicle and the target intersection reaches the enlarged view generation distance Dg1, the intersection enlarged view generator F42 is instructed to generate an intersection enlarged view of the target intersection. Further, when the distance between the host vehicle and the target intersection reaches the enlarged view display distance Dg2, a display switch is made from the display of the direction sign image to the display of the intersection enlarged view in compliance with the rule R24 (steps S221 and S223).

FIG. 10C illustrates an example of an operation that is performed when a non-target intersection for which a direction sign is installed exists at a distance of 400 meters from a target intersection for which a direction sign is installed. In FIG. 10C, the outline arrow indicates the traveling direction of the host vehicle. For the sake of convenience, the direction sign for the target intersection is referred to as the first direction sign and the direction sign for the non-target intersection is referred to as the second direction sign. It is assumed that the first direction sign is installed at a point 50 meters away from the target intersection, and that the second direction sign is installed at a point 50 meters away from the non-target intersection.

When the host vehicle travels toward the target intersection in the above-described situation, the second direction sign, which is related to the non-target intersection, is detected first. The non-target intersection, which is related to the second direction sign, exists within the sign display prohibition distance Dh (set to 700 meters in the current example) from the target intersection. Therefore, in compliance with the rule R22, the display control unit F31 determines that the image of the second direction sign should not be displayed (step S205). In other words, control is exercised so as not to display the direction sign image related to the non-target intersection.

The display of the direction sign image related to the target intersection starts at a point 350 meters before the target intersection. FIG. 10C indicates that the guidance control unit F3 prepares the direction sign image for the non-target intersection by controlling the direction sign image generator F41 to generate the direction sign image for the non-target intersection. However, the direction sign image will not be displayed finally. In another example, the direction sign image may not be generated by the direction sign image generator F41.

The above-described configuration can reduce the switching frequency of images displayed on the display device 4. The configuration provides a scheme for solving the following difficulty. When the image displayed on the display device 4 of the navigation apparatus 100 frequently switches, the driver generally feels bothered and is likely to miss more important information included in various pieces of information provided by images.

More specifically, when the rule R22 is not in the situation indicated in FIG. 10C, the direction sign image for the non-target intersection is displayed as well. The non-target intersection is located only 400 meters away from the target intersection. Therefore, when the host vehicle travels approximately 50 m after the display of the direction sign for the non-target intersection is terminated, the direction sign image for the target intersection appears on display. In other words, the information displayed on the display device 4 switches at a short interval.

As such being the case, setting the rule R22 as described in conjunction with the present embodiment prevents the direction sign image for the non-target intersection from being displayed. This reduces the likelihood of being bothered by frequent changes in the images displayed on the display device 4.

Further, the information about the target intersection at which the driver needs, for example, to turn left or right is more useful for the driver than the information about a non-target intersection through which the driver needs to travel straight. Displaying the direction sign image for a non-target intersection causes frequent change of display images. This makes it likely for the driver to miss the direction sign image for the target intersection, which is more useful and important. The above-described configuration of the present embodiment reduces the possibility of the driver missing the information about the target intersection, which is more useful. Herein, the missing of the information about the target intersection is caused by the display of the information about the non-target intersection.

The sign display prohibition distance Dh should be set to a value that reduces the likelihood of causing frequent changes in the image displayed on screen. Herein, the frequent changes in the image displayed on screen is caused by displaying the direction sign image for the non-target intersection. It is assumed in the present embodiment that the sign display prohibition distance Dh is set to, for example, 700 meters. The sign display prohibition distance Dh is not limited to 700 meters. Further, the sign display prohibition distance Dh may be determined based on the distance between a target intersection and a point where the display of a direction sign image for the target intersection is activated. For example, the sign display prohibition distance Dh may alternatively be determined by adding a fixed distance (for example, 500 meters) to the distance between the target intersection and the point where the display of a direction sign image for the target intersection is activated. This configuration can deactivate a display of a direction sign image for a non-target intersection which exists within a distance of 500 meters from the point where the display of a direction sign image for the target intersection is activated.

Operations and advantages of the navigation apparatus 100 according to the present embodiment will now be summarized. When the display control unit F31 displays an intersection guidance image for a target intersection and an intersection enlarged view for the same target intersection during the route guidance process which is executed by the guidance control unit F3, the configuration according to the present embodiment first displays a direction sign for the target intersection, and then displays the intersection enlarged view.

More specifically, when the distance between the host vehicle and the installation location of the direction sign related to the target intersection reaches the sign display distance Df2, the display of a direction sign image for the target intersection is activated (step S209). When the distance between the host vehicle and the target intersection reaches the enlarged view display distance Dg2, the display of the intersection enlarged view is activated (step S223). Here, the enlarged view display distance Dg2 is set to be shorter than the sign display distance Df2.

When a direction sign related to a target intersection is installed at the target intersection, a point where an intersection enlarged view appears on display is closer to the target intersection than a point where a direction sign appears on display (see FIG. 10A). In other words, the point where the direction sign appears on display is apart from the target intersection and is closer to the host vehicle than the point where the intersection enlarged view appears on display. Therefore, when the direction sign for the target intersection is installed at the target intersection, the direction sign image first appears on display, and then the intersection enlarged view appears on display.

Usually, a direction sign of an intersection is not installed at a point apart from the vehicle by a distance longer than a distance from the vehicle to the intersection, but is installed at a point apart from the vehicle by a distance shorter than the distance from the vehicle to the intersection. Therefore, when a direction sign related to a target intersection is not installed right at the target intersection, the direction sign is usually installed closer to the host vehicle than to the target intersection. In the present embodiment, the display start point for a direction sign image is determined based on the installation location of the direction sign. Therefore, when the direction sign is installed closer to the host vehicle than to the target intersection, the display start point for the direction sign image is also closer to the host vehicle. In other words, even when the direction sign is not installed at the target intersection, the direction sign image first appears on display, and then the intersection enlarged view appears on display (see FIGS. 10B and 10C).

Consequently, when the vehicle approaches a target intersection, the above-described configuration causes the display control unit F31 to first display the direction sign for the target intersection and then display the intersection enlarged view.

Characteristics of the intersection enlarged view and of the direction sign image will now be described. The direction sign image shows directions of respective roads connected to an intersection. Therefore, by viewing the direction sign image, the driver can recognize the direction of traveling (for example, moving straight forward or turning left) at the intersection related to the direction sign image. However, the direction sign image does not include information about facilities serving as landmarks for the intersection. Thus, the driver may erroneously recognize an irrelevant intersection as the target intersection indicated by the direction sign image.

The intersection enlarged view disclosed, for instance, in Patent Literature 2 includes information about facilities serving as landmarks for the associated intersection. Therefore, it can be said that the intersection enlarged view is an image showing greater details of the associated intersection than a direction sign image.

When the host vehicle is relatively far from a target intersection, the present embodiment displays a direction sign image. When the host vehicle is relatively near the target intersection, the present embodiment displays an intersection enlarged view that presents detailed information about the target intersection. This reduces the possibility of the driver missing the target intersection.

Further, when an image displayed on the display device is replaced by the intersection enlarged view to provide a greater amount of information, the driver can recognize the distance between the host vehicle and the target intersection. This further reduces the possibility of the driver missing the target intersection.

As disclosed in Patent Literature 2, when only an intersection enlarged view is displayed without the direction sign image, it is also possible to reduce the possibility of missing the target intersection. However, Patent Literature 2 does not take into account the fact that the usefulness of the intersection enlarged view varies depending on the location of the host vehicle.

More specifically, the intersection enlarged view is an image obtained by enlarging the image of a target intersection. Therefore, the usefulness of the intersection enlarged view is low when the host vehicle is far from the target intersection. The usefulness gradually increases when the host vehicle approaches the target intersection. For example, even when an intersection enlarged view is displayed at a distance, for instance, of 700 meters from the target intersection, that is, at a point where it takes a considerable amount of time for the host vehicle to reach the target intersection, the information included in the intersection enlarged view is not likely to be used. Besides, the driver might be bothered by on-screen information that will not be used for a while.

In other words, when the enlarged view display distance Dg2 is set to be relatively long in Patent Literature 2, the distance (or the time) during which the intersection enlarged view being displayed is increased. As a result, the driver might be bothered by the early displayed enlarged view of the intersection. When the enlarged view display distance Dg2 is set to be relatively short in Patent Literature 2, the intersection enlarged view abruptly appears on display. Depending on traffic conditions, abrupt display of the intersection enlarged view could make it difficult, for the driver, to change lanes for a left or right turn in compliance with guidance provided by the intersection enlarged view before reaching the target intersection.

As described earlier, the present embodiment is configured so that the display control unit displays an intersection enlarged view after displaying a direction sign image. As the direction sign image is displayed before displaying the intersection enlarged view, it is possible to inform the driver of the approaching level to the target intersection and of the direction of traveling at the target intersection.

In the present embodiment even when the enlarged view display distance Dg2 is set to be relatively short, the driver will not abruptly be informed of the proximity to the target intersection. This enables the driver, for example, to change lanes beforehand for a left or right turn based on the direction sign image. In other words, since the direction sign image is displayed before displaying the intersection enlarged view, the enlarged view display distance can be set to be relatively short. Besides, enlarged view display conditions can be set so as to display the intersection enlarged view at a point of time where the usefulness of the intersection enlarged view is considered to be high.

Further, setting the enlarged view display distance to be relatively short reduces the possibility of the driver being bothered by an intersection enlarged view that is displayed at a point relatively far from the target intersection, that is, at a point where the usefulness of the intersection enlarged view is considered to be low.

Consequently, the above-described configuration makes it possible to provide more appropriate guidance based on the distance between the host vehicle and the target intersection.

While an embodiment of the present disclosure has been described above, it should be understood that the present disclosure is not limited to the above-described embodiment. The following modifications are also included in the technical scope of the present disclosure. Further, in addition to the following modifications, various other modifications may be made without departing from the spirit of the present disclosure.

(First Modification)

The above-described embodiment is configured so that the direction sign image generator F41 generates the direction sign image. The present disclosure is not limited to such a configuration. As a first modification, the direction sign image may be preliminarily stored in the map DB 3 as the map data instead of generating the direction sign image. In this configuration, the guidance control unit F3 accesses the map DB 3, reads out the direction sign image to be displayed, and displays the readout direction sign image. Image data about a direction sign may be stored in association, for instance, with a location where the direction sign is actually installed on a link. For example, the link data may be prepared as the direction sign data.

In addition, the intersection enlarged view may also be prepared as the map data in the map DB 3. Further, pre-generated intersection enlarged views and direction sign images may be stored in the external memory 7 in association, for instance, with map coordinates where the pre-generated intersection enlarged views and direction sign images are to be displayed.

(Second Modification)

The above-described embodiment is configured so that the display of a direction sign image terminates when, for instance, the intersection guidance image is changed to an intersection enlarged view or the vehicle has passed an intersection indicated by an associated direction sign. The present disclosure is not limited to such a configuration. For example, the display of the direction sign image may terminate before the intersection enlarged view is displayed or before the vehicle pass an intersection indicated by the direction sign image.

A second modification is achieved by using an alternative configuration that retains the direction sign image as a displayable image when the host vehicle exists between a direction sign image display point and a direction sign installation location. Further, the intersection enlarged view is retained as a displayable image from when the vehicle reaches a point apart from the target intersection by the enlarged view generation distance Dg1, similar to the above-described embodiment. In this case, the display control unit F31 controls an on-screen image in compliance with rules R31 to R34 described below.

Rule R31: The intersection enlarged view is displayed when the host vehicle exists between a target intersection and a point that is at a predetermined distance (hereinafter referred to as the enlarged view displayable distance) Dg3 from the target intersection in a direction toward the host vehicle.

Rule R32: The direction sign image is displayed when the host vehicle exists between a direction sign installation location and a point apart from the direction sign installation location by the sign display distance Df2 in a direction toward the host vehicle.

Rule R33: The intersection enlarged view is displayed at a higher priority at a point that is within the enlarged view display distance Dg2 from a target intersection. The direction sign image is displayed at a higher priority at a point that is apart from the target intersection by more than the enlarged view display distance Dg2.

Rule R34: The direction sign image for a non-target intersection existing within the sign display prohibition distance Dh from a target intersection will not be displayed.

The enlarged view displayable distance Dg3 is a distance from a target intersection that defines a point where the intersection enlarged view can be displayed. In the above-described embodiment, the enlarged view generation distance Dg1 corresponds to the enlarged view displayable distance Dg3. The enlarged view displayable distance Dg3 should be equal to or shorter than the enlarged view generation distance Dg1 and should be equal to or longer than the enlarged view display distance Dg2. The rule R31 corresponds to a first rule, and the rule R32 corresponds to a second rule.

The rules R31 to R33 can be rephrased as indicated below.

Rule R31a: A displayable intersection guidance image is displayed.

Rule R32a: The intersection enlarged view is displayed at a higher priority at a point that is within the enlarged view display distance Dg2 from a target intersection. The direction sign image is displayed at a higher priority at a point that is apart from the target intersection by more than the enlarged view display distance Dg2.

Operations performed by the display control unit F31 will now be described with reference to FIGS. 11A to 11C.

Figure 11A:
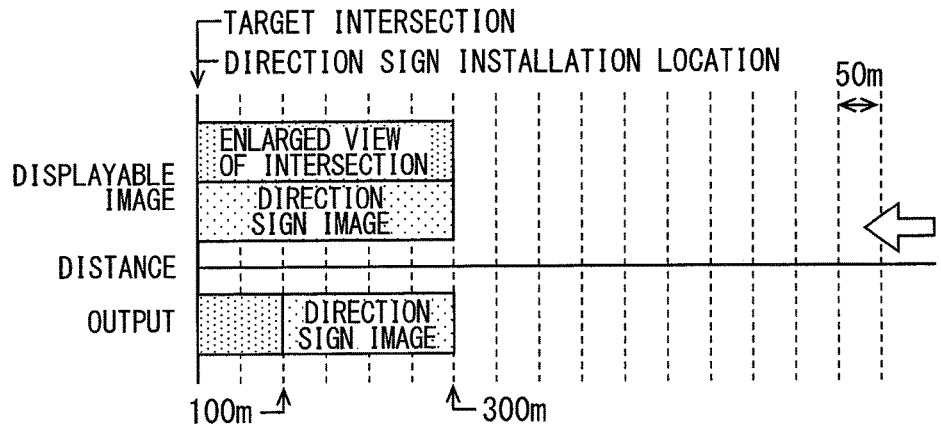
FIG. 11A is a diagram illustrating an operation that is performed by the navigation apparatus during a route guidance process according to a second modification of the present disclosure.
Figure 11B:
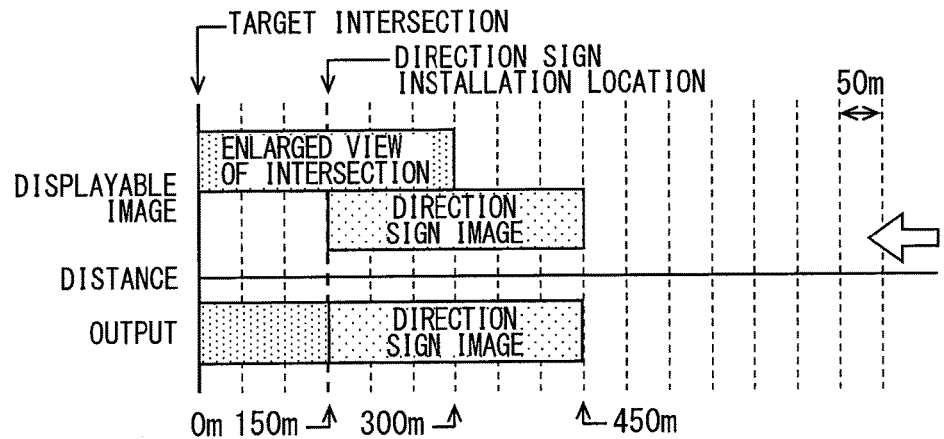
FIG. 11B is a diagram illustrating an operation that is performed by the navigation apparatus during a route guidance process according to the second modification.
Figure 11C:
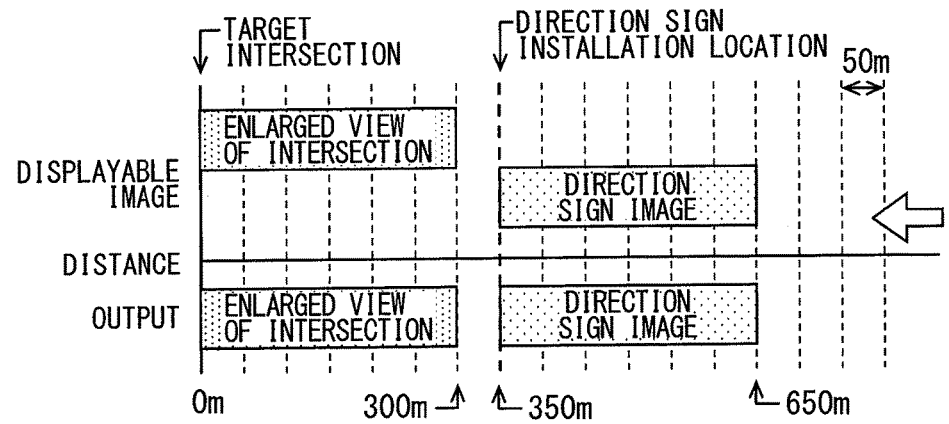
FIG. 11C is a diagram illustrating an operation that is performed by the navigation apparatus during a route guidance process according to the second modification.

FIGS. 11A to 11C illustrate operations performed in accordance with the second modification. FIGS. 11A, 11B, and 11C each illustrate an example of an operation that is performed when the host vehicle is near a target intersection for which a direction sign is installed. In the second modification, it is assumed, for example, that both the enlarged view generation distance Dg1 and the sign generation distance Df1 are set to 300 meters.

FIG. 11A illustrates a case where a direction sign is installed at a target intersection. In FIG. 11A, the outline arrow indicates the traveling direction of the host vehicle. In this case, both the direction sign image and the intersection enlarged view exist as displayable intersection guidance images between the target intersection and a point 300 meters before the target intersection.

In the above case, when the host vehicle is apart from the target intersection by the enlarged view display distance Dg2 (set to 100 meters in the current example) or longer, the direction sign image is displayed at a higher priority. In other words, although the direction sign image and the intersection enlarged view can be both displayed as the intersection guidance images, only the direction sign image is displayed as the intersection guidance image without displaying the intersection enlarged view. Subsequently, when the host vehicle further approaches the target intersection and the distance between the host vehicle and the target intersection becomes equal to or shorter than the enlarged view generation distance Dg1, the display control unit F31 displays the intersection enlarged view as the intersection guidance image.

FIG. 11B illustrates an example of an operation that is performed when a direction sign is installed at a distance (set to 150 meters in the current example) from a target intersection in a direction toward the host vehicle. In FIG. 11B, the outline arrow indicates the traveling direction of the host vehicle. In this case, the direction sign image can be displayed between a point that is at the sign generation distance Df1 before the direction sign installation location, namely, a point 450 meters before the target intersection, and a point 150 meters before the target intersection. The intersection enlarged view can be displayed between the target intersection and a point 300 meters before the target intersection, similar to the case shown in FIG. 11A.

In the above case, only a direction sign image can be displayed as the intersection guidance image while the host vehicle is traveling between a point 450 meters before the target intersection and a point 300 meters before the target intersection. Therefore, the display control unit F31 displays the direction sign image as the intersection guidance image between a point 450 meters before the target intersection and a point 300 meters before the target intersection.

While the host vehicle is traveling between a point 300 meters before the target intersection and a point 150 meters before the target intersection, both the direction sign image and the intersection enlarged view can be displayed as the intersection guidance images. In this case, since the host vehicle is still apart from the target intersection by a distance equal to or longer than the enlarged view display distance Dg2, the direction sign image appears on display in compliance with the rule R31.

Subsequently, when the host vehicle further approaches the target intersection and is traveling within a distance of 150 meters from the target intersection, only the intersection enlarged view can be displayed as the intersection guidance image. Therefore, the display control unit F31 displays the intersection enlarged view as the intersection guidance image.

FIG. 11C illustrates an example of an operation that is performed when a direction sign is installed at a distance (350 meters in the current example) from a target intersection in a direction toward the host vehicle. In FIG. 11C, the outline arrow indicates the traveling direction of the host vehicle. In this case, the direction sign image can be displayed between a point that is at the sign generation distance Df1 before the direction sign installation location, namely, a point 650 meters before the target intersection, and a point 350 meters before the target intersection. The intersection enlarged view can be displayed between the target intersection and a point 300 meters before the target intersection.

In the case illustrated in FIG. 11C, there is no interval during which the direction sign image and the intersection enlarged view can be both displayed. Therefore, the display control unit F31 displays a displayable intersection guidance image at each point. In this example, no displayable intersection guidance image exists within a time interval of 50 m between a point 350 meters before the target intersection and a point 300 meters before the target intersection. Thus, the display control unit F31 displays no intersection guidance image during such an interval. During this time interval, the display control unit F31 may display, for example, a lane list of a link on which the host vehicle is currently traveling.

The second modification described above also provides the same effects as the above-described embodiment. Besides, the second modification is configured so that even when the distance between the host vehicle and the target intersection is longer than the enlarged view display distance Dg2, the intersection enlarged view can be displayed as far as the vehicle passes the installation location of a direction sign, as illustrated in FIG. 11C.

Further, there may be a case where a direction sign is associated with no intersection due to the lack of definition of association between direction signs and intersections depending on the type of map data. When the above-described embodiment or a later-described third modification uses such map data, direction sign images cannot be displayed as it is not possible to determine which intersection each direction sign is related to.

Even when the employed map data does not define the association between direction signs and intersections, the second modification makes it possible to display an intersection enlarged view after displaying a direction sign image.

It is assumed that such map data includes pre-generated direction sign images as direction sign data as described in conjunction with the first modification. Further, when the employed map data does not define the association between direction signs and intersections, the rule R34 should be changed to a rule R34a as indicated below.

Rule R34a: When multiple direction signs exist within the sign display prohibition distance Dh from a target intersection, only the direction sign image of a direction sign closest to the target intersection is displayed.

When the above rule is applied, the advantages described with reference to FIG. 10C will be provided. In other words, the above rule reduces the likelihood of causing frequent display switch in the image displayed on the display device 4 within an area near a target intersection.

During the route non-guidance process, the direction sign image may also be displayed in compliance with the rule R32.

(Third Modification)

In the above-described embodiment and the second modification, the point where the display of the direction sign image starts is determined based on a location (namely, coordinates) where a direction sign is actually installed on a link. The method of determining the point where the display of the direction sign image starts is not limited to the above. A third modification is achieved by using an alternative configuration that determines the point where the display of the direction sign image starts based on an intersection related to the direction sign image. For example, the rule R11 and the rule R21, which are described in conjunction with the above-described embodiment, may be changed to a rule R11a and a rule R21a as indicated below.

Rule R11a (rule R21a): The direction sign image is displayed when the distance between the host vehicle and an intersection related to the direction sign image is within the sign display distance Df2 from the installation location of an associated direction sign.

Accordingly, it goes without saying that the standard for causing the direction sign image generator F41 to generate the direction sign image is also determined based on the location of an intersection related to the direction sign image and not based on the installation location of the associated direction sign. More specifically, when the distance between the host vehicle and the intersection reaches the sign generation distance Df1, the direction sign image generator F41 generates the direction sign image and makes the generated direction sign image ready for display.

Figure 12:
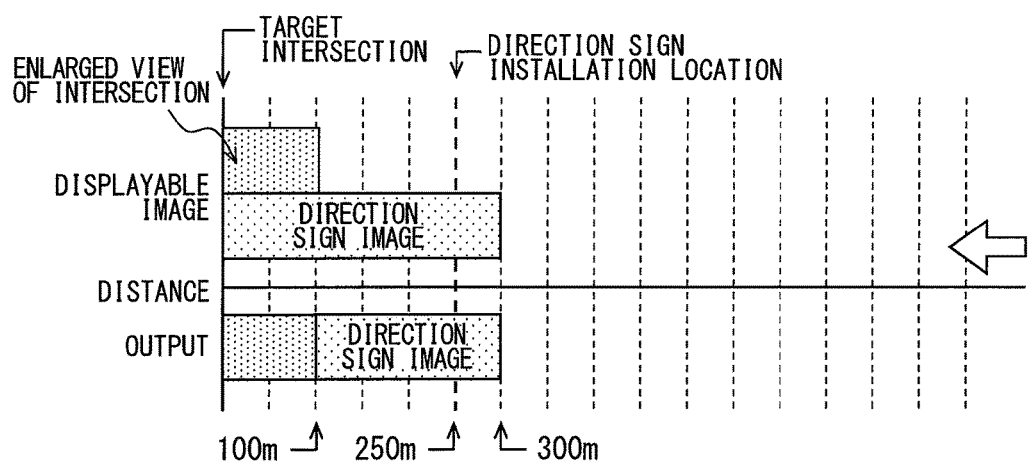
FIG. 12 is a diagram illustrating an operation that is performed by the navigation apparatus during a route guidance process according to a third modification of the present disclosure.

An example of an operation performed by the display control unit F31 in the third modification is illustrated in FIG. 12. The exemplary operation illustrated in FIG. 12 is performed when the host vehicle approaches a target intersection for which a direction sign is installed and the direction sign is installed at a point 250 meters away from the target intersection. In FIG. 12, the outline arrow indicates the traveling direction of the host vehicle.

In the third modification, a point where the display of a direction sign image starts is determined based on the location of a target intersection even if an associated direction sign is installed apart from the target intersection. More specifically, in a situation illustrated in FIG. 12, the display of the direction sign image starts at the sign display distance Df2 before the target intersection. Subsequently, when the host vehicle further approaches until the distance between the host vehicle and the target intersection is within the enlarged view display distance Dg2, the intersection guidance image to be displayed on the display device 4 changes from the direction sign image to the intersection enlarged view.

The third modification described above also provides the same effects as the above-described embodiment. Further, even when the route non-guidance process is being performed, the direction sign image is displayed in compliance with the rule R11a.

(Fourth Modification)

In the above-described embodiment and the foregoing modifications, the direction sign image is displayed with respect to an intersection for which a direction sign is installed. The direction sign image display scheme is not limited to the above. A fourth modification is achieved by using an alternative configuration that generates and displays the direction sign image for a target intersection even when a direction sign is not installed on an actual road.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A navigation apparatus comprising:
a host vehicle location acquisition unit configured to acquire a current location of a host vehicle;
a route guidance unit configured to perform a route guidance process for guiding the host vehicle along a guidance route from the current location of the host vehicle to a destination based on the current location of the host vehicle and map data indicative of road connections, wherein the current location of the host vehicle is acquired by the host vehicle location acquisition unit;
a display control unit configured to control a display of an intersection guidance image, wherein the intersection guidance image provides a guidance on an intersection to be possibly travelled by the host vehicle;
a sign image acquisition unit configured to acquire a direction sign image, wherein the direction sign image is an image of a direction sign that indicates leading directions of roads connected to the intersection; and
an intersection enlarged view acquisition unit configured to acquire an intersection enlarged view, wherein the intersection enlarged view is an image providing a guidance on a traveling direction of the host vehicle at a target intersection located in forward direction of the host vehicle along the guidance route, the intersection enlarged view includes symbols indicative of facilities serving as landmarks of the target intersection,
the display control unit displays, as the intersection guidance image, a direction sign image corresponding to the target intersection prior to the intersection enlarged view of the target intersection during the route guidance process which is performed by the route guidance unit,
during the route guidance process which is performed by the route guidance unit, the display control unit:
displays the intersection enlarged view as the intersection guidance image when a remaining distance between the host vehicle and the target intersection is within an enlarged view display distance; and
displays the direction sign image corresponding to the target intersection as the intersection guidance image while the host vehicle travels toward the target intersection within a segment defined between a point prior to an installation location of a direction sign of the target intersection by a sign display distance and a point prior to the target intersection by the enlarged view display distance, and
the sign display distance and the enlarged view display distance are preliminarily set so that the sign display distance is longer than the enlarged view display distance.

2. The navigation apparatus according to claim 1, wherein,
in a situation where the route guidance process is not being performed by the route guidance unit, the display control unit displays, as the intersection guidance image, the direction sign image corresponding to the intersection while the host vehicle travels toward the intersection within a segment defined between a point prior to an installation location of the direction sign of the intersection by the sign display distance and a point where the intersection is located.

3. A navigation apparatus comprising:
a host vehicle location acquisition unit configured to acquire a current location of a host vehicle;
a route guidance unit configured to perform a route guidance process for guiding the host vehicle along a guidance route from the current location of the host vehicle to a destination based on the current location of the host vehicle and map data indicative of road connections, wherein the current location of the host vehicle is acquired by the host vehicle location acquisition unit;
a display control unit configured to control a display of an intersection guidance image, wherein the intersection guidance image provides a guidance on an intersection to be possibly travelled by the host vehicle;
a sign image acquisition unit configured to acquire a direction sign image, wherein the direction sign image is an image of a direction sign that indicates leading directions of roads connected to the intersection; and
an intersection enlarged view acquisition unit configured to acquire an intersection enlarged view, wherein the intersection enlarged view is an image providing a guidance on a traveling direction of the host vehicle at a target intersection located in forward direction of the host vehicle along the guidance route, the intersection enlarged view includes symbols indicative of facilities serving as landmarks of the target intersection,
the display control unit displays, as the intersection guidance image, a direction sign image corresponding to the target intersection prior to the intersection enlarged view of the target intersection during the route guidance process which is performed by the route guidance unit,
during the route guidance process which is performed by the route guidance unit, the display control unit controls the intersection guidance image to be displayed in compliance with:
a first rule under which the intersection enlarged view is displayed as the intersection guidance image when a distance between the current location of the host vehicle and the target intersection is within an enlarged view display distance; and
a second rule under which the direction sign image is displayed as the intersection guidance image while the host vehicle travels toward the target intersection within a segment defined between a point prior to an installation location of a direction sign of the target intersection by a sign display distance and a point where the direction sign of the target intersection is installed,
the sign display distance and the enlarged view display distance are preliminarily set so that the sign display distance is longer than the enlarged view display distance, and
in a situation where the intersection enlarged view needs to be displayed in compliance with the first rule and simultaneously the direction sign image needs to be displayed in compliance with the second rule, the display control unit displays the intersection guidance image in compliance with the first rule with a higher priority.

4. The navigation apparatus according to claim 3, wherein, in a situation where the route guidance process is not being performed by the route guidance unit, the display control unit displays, as the intersection guidance image, the direction sign image corresponding to the intersection while the host vehicle travels toward the intersection within a segment defined between a point prior to an installation location of the direction sign of the intersection by the sign display distance and a point where the direction sign is installed.

5. The navigation apparatus according to claim 3, wherein, in the map data, the direction sign image is correlated with the installation location of the corresponding direction sign on a road and the direction sign image is not correlated with the intersection for which the direction sign image is provided for guidance purpose.

\* \* \* \* \*